2 Sheets--Sheet 1.

L. R. PALMER.
Improvement in Machines for Jointing Staves.

No. 130,739. Patented Aug. 20, 1872.

Witnesses.
C. F. Brown
N. H. Ellsworth

Inventor.
Lemuel R. Palmer
By his Attys.
Hill & Ellsworth.

AM. PHOTO-LITHOGRAPHIC CO. N.Y. (OSBORNE'S PROCESS.)

L. R. PALMER.
Improvement in Machines for Jointing Staves.

No. 130,739.

2 Sheets--Sheet 2

Patented Aug. 20, 1872.

Witnesses:

Inventor:
Lemuel R. Palmer
By his Attys.

UNITED STATES PATENT OFFICE.

LEMUEL R. PALMER, OF BELFAST, MAINE.

IMPROVEMENT IN MACHINES FOR JOINTING STAVES.

Specification forming part of Letters Patent No. 130,739, dated August 20, 1872.

*To all whom it may concern:*

Be it known that I, LEMUEL R. PALMER, of Belfast, in the county of Waldo and State of Maine, have invented a new and useful Improvement in Stave-Machines; and I do hereby declare the following to be a full, clear, and exact description of the same, reference being had to the accompanying drawing forming part of this specification, in which—

Figure 1:
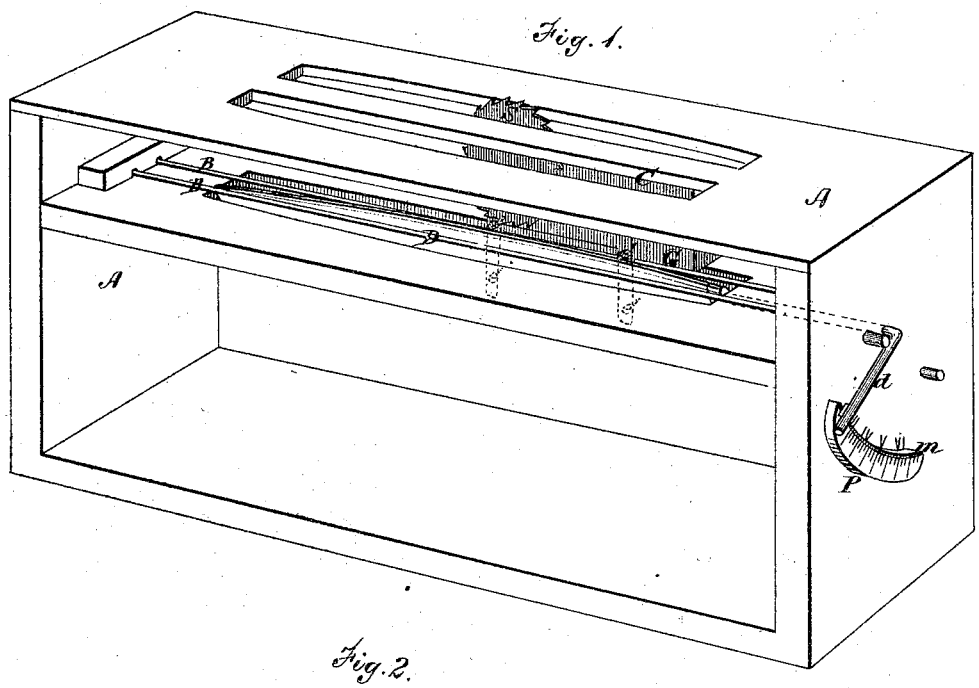
Figure 2:
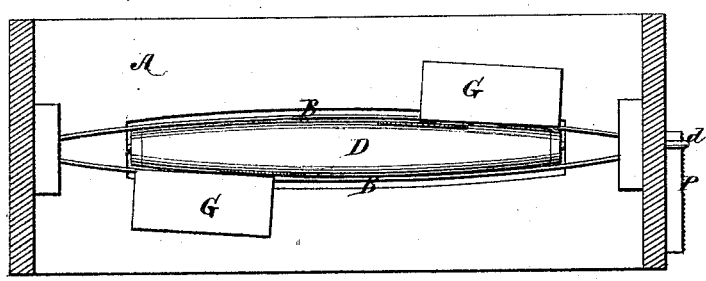
Figure 3:
Figure 4:
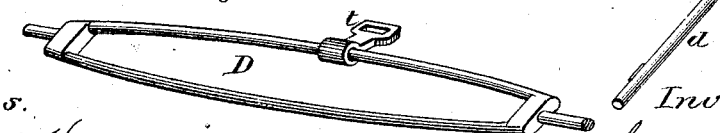
Figure 5:
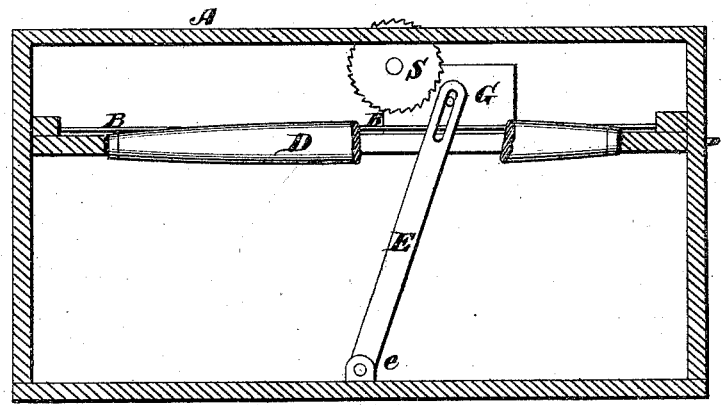

Figures 1 and 5 are views of the machine representing different modifications; Fig. 2, a horizontal section of the same; Fig. 3, a perspective view of the guide-block detached; and Figs. 4 and 6, modifications which dispense with the spring-rods.

Similar letters of reference in the accompanying drawing indicate the same parts.

The object of this invention is to provide an improved means for adjusting the taper of the stave according to its width; and to this end the invention consists, first, in the employment of the guide-block to vary the curvature of the guide-tracks; and, secondly, in the details of construction and combination of parts, as hereinafter set forth.

My invention may be embodied either in a machine having a movable stave-carriage and one or two stationary saws, or in a machine having the stave-carriage stationary and the saw or saws movable. The latter form is represented in the drawing, where A is the frame of the machine; S, one of the saws; G, the movable carriage that supports the saw, which is arranged at the end of the carriage; and D, a guide-block, which governs the movement of the saw and determines the taper and width of the stave. This block or guide is preferably constructed as shown in Figs. 1, 2, 3, and 5, being about the length of an ordinary stave, and tapering from the center toward each end, its cross-section at any point being elliptical. Whether of wood or metal it is carefully made, so as to insure the proportionate curve at any angle of adjustment. It is hung upon journals at its ends in such a manner that by turning the crank *d* partially around the longer transverse axis of the guide can be brought to either a horizontal or vertical position, or to any intermediate inclination, and its lateral curvature thus increased or diminished at will, thereby furnishing means for increasing or diminishing the curve followed by the stave or saw carriage. The movable carriage is guided entirely by the lateral curvature of the block D, preferably in the following manner: A long staff or lever, E, is articulated at its lower end to the bottom of the frame, as shown at *e*, and at its upper end is connected to the carriage G in any suitable manner, so as to leave said carriage free to move longitudinally in straight lines or curves. This lever bears against the side of the guide D, and is held in contact with it by means of a spring-rod, B, as shown. When the carriage is moved the pressure of the spring-rod causes the lever to guide it in a curve corresponding to the line on the guide-block touched by the lever. By inclining the guide-block more or less such line is varied, and the result is a greater or less curve in the movement of the carriage.

When two saw-carriages are used, as shown in Fig. 2, both are guided by the blocks, and the course of both adjusted by a single movement of the crank. It is necessary simply to lay the stave in place, adjust the saws by the eye, (a matter which the close conjunction of the saws with the end of the stave makes very easy,) and pass the saws by the stave; and the result is a stave ready to be put into its place in the cask, whether large or small. The movement of the crank spreads the saws to the desired width of the stave, and, at the same time, by the same means changes the curvature of the track to correspond to such width.

In lieu of the pivoted bar E, I may attach rigid arms *e'*, Fig. 1, to the carriage in such a manner that they will project down between the guide and the spring-rods, and thereby control the movement of the carriage. The inclination of the guide, when adjusted to give any desired curve to the track, can be fixed by locking the crank *d*, or letting it engage with the notches of a rack, *m*, provided for the purpose. The extent of the curvature necessary for any width of stave can be indicated upon a plate, P, by marking the width of the stave in inches at the point where the crank should be fixed to give the proper curvature for that width.

The leading principle of this invention is the employment of the curved guide D and the holding of the carriage against it so that the inclination of the guide will determine the curvature of the carriage-track. I do not limit myself to the already-described construction of the parts by which this is effected, for there are many equivalents of those devices coming within the principle of my invention.

Any form of spring or weight may be used, for example, that will keep the carriage pressed against the block D. So, too, the form of the block D may be considerably varied without destroying its utility. Indeed, the spring-rods may be avoided altogether; as, for example, by making the guide in the form represented in Fig. 4 and attaching to one of its curved side rods a sliding plate, $t$, which will freely turn on the rod. The carriage, being connected to the outer end of the plate either by passing one of the arms $e'$ down through the hole in the outer end of the plate or otherwise, will conform to the lateral curvature of the part D.

Figure 6:
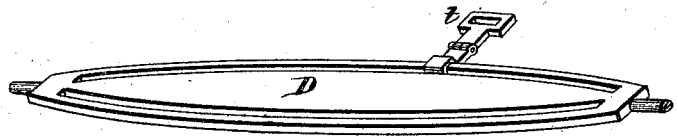

Instead of the form of guide shown in Fig. 4 a form like that of Fig. 3 might be employed, having a groove or ribs along the curved edges, the sliding plate being constructed to be held in place by the groove or ribs, and being provided with a hinged leaf or a flexible connection to which to attach the arm $e'$ or E, the object of the hinged leaf or flexible connection being to prevent the inclination of the guide D from causing the connecting-plate to bind on the arm. This method of construction is represented in Fig. 6.

The carriage may be moved back and forth by any suitable means.

Having thus described my invention, what I claim is—

1. The tapering guide D, combined with the carriage of a stave-jointer, substantially as described, for the purposes specified.

2. The spring-rods B B, in combination with the adjustable guide D and the carriage G, substantially as and for the purposes set forth.

3. The crank $d$ and index P, in combination with the guide D and carriage G, substantially as and for the purposes described.

LEMUEL R. PALMER.

Witnesses:
 JOSEPH WILLIAMSON,
 L. H. MURCH,
 JOHN S. CALDWELL.